Dec. 14, 1926.

O. S. VEA

SPRING HOOK

Filed Feb. 10, 1926

1,610,985

INVENTOR
OLAV S VEA

BY *Fetherstonhaugh & Co*

ATTORNEYS

Patented Dec. 14, 1926.

1,610,985

UNITED STATES PATENT OFFICE.

OLAV S. VEA, OF VANCOUVER, BRITISH COLUMBIA, CANADA.

SPRING HOOK.

Application filed February 10, 1926, Serial No. 87,401, and in Canada January 13, 1926.

My invention relates to improvements in spring hooks which while of use in harness work, hoisting gear and the like, is particularly suited for attachment to purse seine nets and through which the purse line is adapted to be drawn when closing the net prior to lifting the catch onboard the seine boat. Particular objects of the hook when used for this purpose are to provide means whereby the purse line may be readily detached from the bight of the hook as required, and when the hook is closed, to provide a structure of extreme strength so that the strain imparted to the hook by the weight of the catch, when raised from the water, will not cause the hook to open or allow any of the fish to fall from the net.

The invention consists essentially of a hook suspended from an eye, and a hinged keeper adapted to extend from the eye to the bill of the hook to close the gap normally existing therebetween, as will be more fully described in the following specification, in which:—

In the drawings like characters of reference indicate corresponding parts in each figure.

Figure 1:
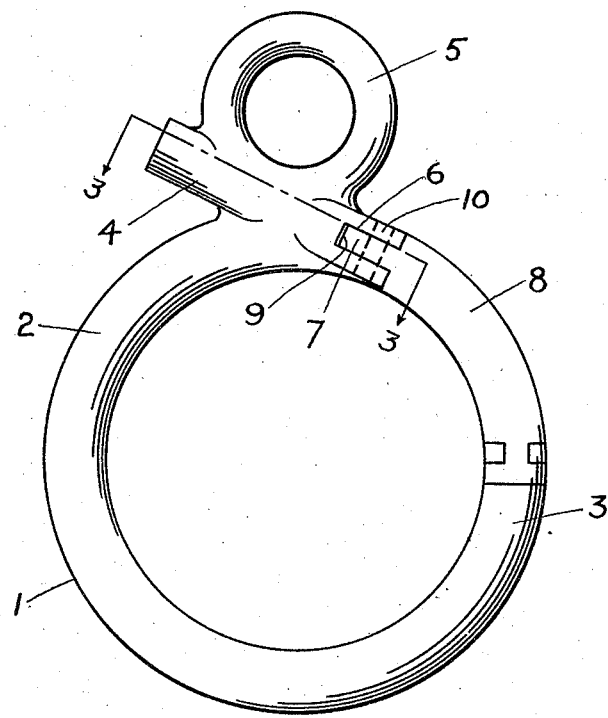
Fig. 1 is a general view of the invention.
Figure 3:
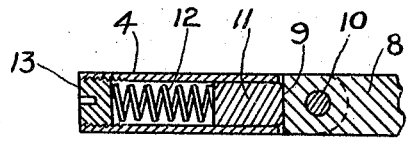
Fig. 3 is a sectional view of the spring barrel taken on the line 3—3 of Figure 1.

The numeral 1 indicates generally a hook having a shank 2 and a bill 3, the shank 2 extends from a spring barrel 4 which is preferably formed at the intersection of the eye 5 and the hook. The spring barrel is slotted at one end as at 6 to receive the hinge member 7 of a keeper 8, the hinge member 7 is, at its outer end 9 formed at an angle of 90 degrees to its length and is fulcrumed within the slot 6 upon a hinge pin 10.

Figure 2:
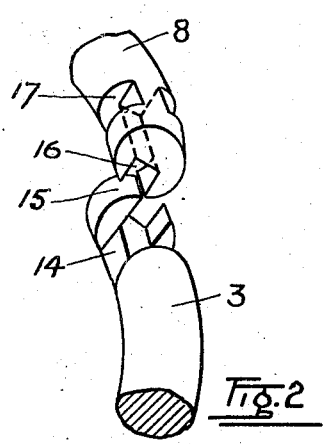
Fig. 2 is a fractionated view showing the hook partly opened.

Mounted within the spring barrel 4 is a plunger 11 adapted to bear upon the end 9 of the hinge member 7 when the keeper 8 is in closed position, and on the side of the hinge member when in open position. A pressure is exerted upon the plunger 11 by a spring 12 which is adjustably held in position by a plug 13 screwed into the outer end of the barrel 4. The outer end of the keeper 8 and the hook bill 3 are so shaped as to form a locked joint when in closed position, as shown in Figure 2, wherein one of the members is provided with a neck portion 14 eccentric to the axis of the member, having a pair of transversely disposed lugs 15 projecting therefrom, the other member is provided with a longitudinal slot 16 into which the neck 14 is adapted to fit, and a pair of transverse slots 17 into which the transversely disposed lugs are adapted to fit.

Having thus described the several parts of my invention I will now briefly explain its operation, when in use on a purse seine net.

The eye portion 5 of the hook is secured to bridles at the lower edge of the net and when fishing a purse line runs freely through the hook 1, which line is drawn in prior to lifting the net to close the bottom of the net by drawing all the hooks together. After swinging the catch aboard it becomes necessary to remove the purse line from the hooks, to accomplish this it suffices to grip each hook by the shank 2 and swing the keeper 8 at right angles to the plane of the hook where it is held by the pressure of the spring pressed plunger 11 bearing upon the side of the hinge member 7 when the line may be conveniently removed.

When the keeper is closed upon the hook, these two members form a continuous structure bound together by a hinge pin 10 and the interlocking joint formed by the members 14, 15, 16 and 17 so that no strain upon the net is liable to damage the hook or cause it to release the purse line carried therein.

What I claim as my invention is:

1. A hook having a main section and a movable closure section pivoted at one end to the main section, the other end of said closure section being notched longitudinally and circumferentially to interlock with a correspondingly notched mating portion of the main section.

2. A hook as recited in claim 1 including a spring-pressed retaining element engageable with angularly related surfaces of the pivoted end of the closure section to retain the latter either in interlocking engagement with the main section or in an open position to one side of said main section.

3. A hook as recited in claim 1 in which the main section of the hook is formed with a hollow portion constituting a cylinder open at both ends and aligned with the pivoted end of the closure section, a plunger slidable in said cylinder to engage angularly related surfaces of the pivoted end of the closure section to retain the latter in closed or open position, a removable member closing the outer end of said cylinder and a spring confined between said member and plunger and serving to press the latter toward the closure member.

4. A hook comprising a continuous body open at the center and including a main section and a movable closure section pivoted at one end to said main section to swing laterally with respect to the plane of the hook body, said main section being formed with a hollow portion constituting a cylinder aligned with the pivoted end of the removable closure section, and a spring pressed plunger operating in said cylinder and adapted to engage angularly related surfaces of the pivoted closure member to retain the latter in closed or open position.

Dated at Vancouver, B. C., this 3rd day of February, 1926.

OLAV S. VEA.